United States Patent
Dubbert et al.

(10) Patent No.: US 7,259,716 B1
(45) Date of Patent: Aug. 21, 2007

(54) QUADRATURE MIXTURE LO SUPPRESSION VIA DSW DAC NOISE DITHER

(75) Inventors: Dale F. Dubbert, Cedar Crest, NM (US); Peter A. Dudley, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 562 days.

(21) Appl. No.: 10/686,168

(22) Filed: Oct. 15, 2003

(51) Int. Cl.
*G01S 7/35* (2006.01)
*H04H 1/40* (2006.01)

(52) U.S. Cl. .................... 342/194; 342/25 F; 342/131; 342/165; 455/76; 455/67.11; 455/115.1

(58) Field of Classification Search ............ 455/63.1, 455/67.11, 67.13, 67.15, 114.2, 115.1, 296, 455/76, 115.2; 342/128, 130, 131, 132, 165, 342/173, 175, 195, 194, 102, 200, 202, 298, 342/300, 25 A, 250, 25 F
See application file for complete search history.

(56) References Cited

U.S. PATENT DOCUMENTS 5,469,167 A * 11/1995 Polge et al. .............. 342/25 A
5,608,404 A * 3/1997 Burns et al. .............. 342/25 A
6,836,240 B1 * 12/2004 Dubbert et al. ............. 342/194
7,023,378 B2 * 4/2006 Coleman et al. ............ 342/128

* cited by examiner

Primary Examiner—Nay Maung
Assistant Examiner—John J. Lee
(74) Attorney, Agent, or Firm—Elmer A. Klavetter

(57) ABSTRACT

A Quadrature Error Corrected Digital Waveform Synthesizer (QECDWS) employs frequency dependent phase error corrections to, in effect, pre-distort the phase characteristic of the chirp to compensate for the frequency dependent phase nonlinearity of the RF and microwave subsystem. In addition, the QECDWS can employ frequency dependent correction vectors to the quadrature amplitude and phase of the synthesized output. The quadrature corrections cancel the radars' quadrature upconverter (mixer) errors to null the unwanted spectral image. A result is the direct generation of an RF waveform, which has a theoretical chirp bandwidth equal to the QECDWS clock frequency (1 to 1.2 GHz) with the high Spurious Free Dynamic Range (SFDR) necessary for high dynamic range radar systems such as SAR. To correct for the problematic upconverter local oscillator (LO) leakage, precision DC offsets can be applied over the chirped pulse using a pseudo-random noise dither. The present dither technique can effectively produce a quadrature DC bias which has the precision required to adequately suppress the LO leakage. A calibration technique can be employed to calculate both the quadrature correction vectors and the LO-nulling DC offsets using the radar built-in test capability.

13 Claims, 8 Drawing Sheets

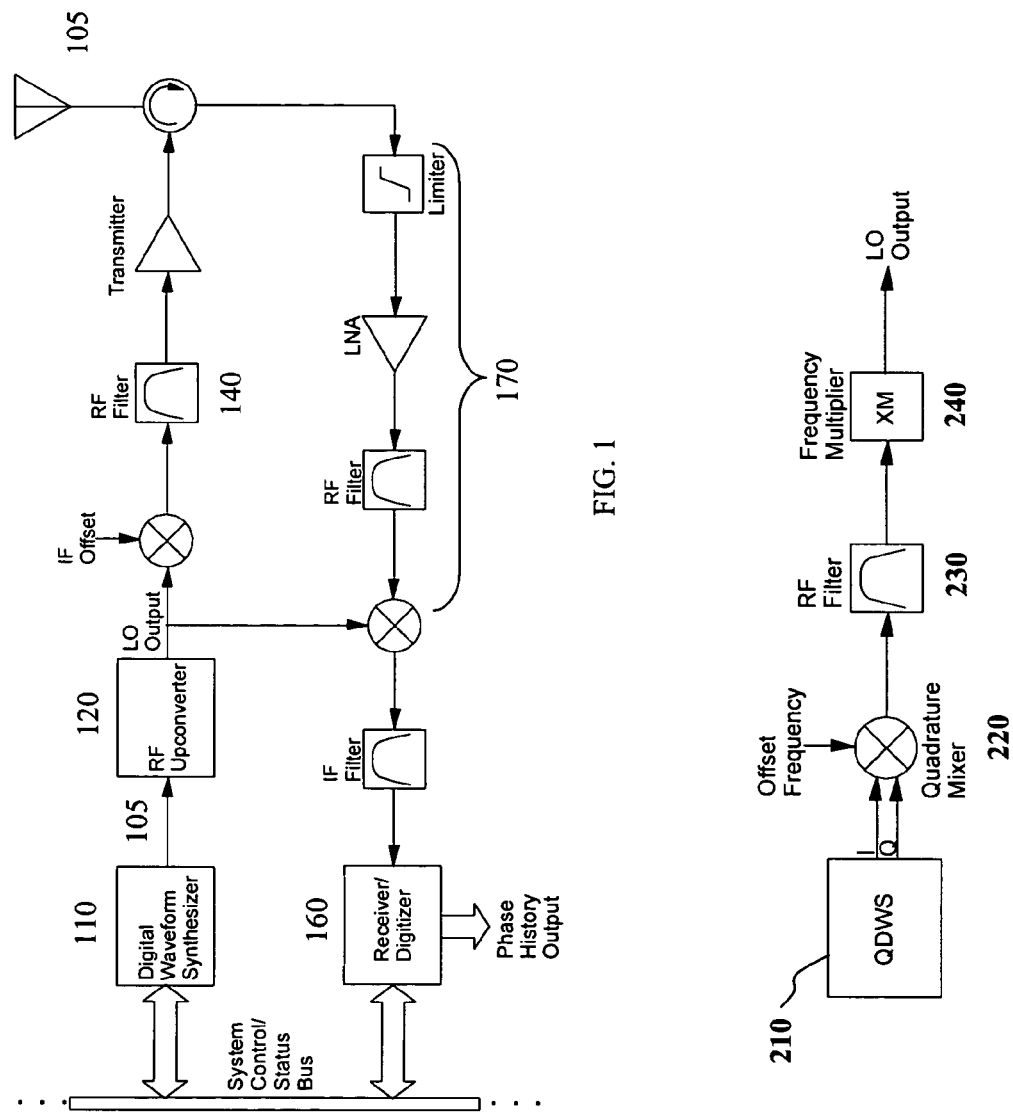

QUADRATURE MIXTURE LO SUPPRESSION VIA DSW DAC NOISE DITHER

GOVERNMENT INTEREST

The present invention was developed under contract DE-AC04-94AL85000 with the United States Department of Energy under. Therefore, the U.S. Government has rights to use of the present invention.

FIELD OF THE INVENTION

The present invention is generally related to synthetic aperture radar systems. More particularly, the present invention is related to radar waveform conditioning and radar receiver modules. Additionally, the present invention is related to the use of noise dithering to facilitate the application of direct current (DC) bias for mixer local oscillator (LO) suppression.

BACKGROUND

It has long been known that additive noise dither with optimum amplitude and proper statistics can improve the spurious free dynamic range (SFDR) of a digital-to-analog converter (DAC) or an analog-to-digital converter (ADC). Use of dithering, however, to achieve precision DC bias for the purpose of mixer LO leakage suppression has not been attempted.

Current generation synthetic aperture radars (SAR) developed at Sandia National Laboratories generally employ a receiver/exciter construct that comprise fundamental components of a high performance, wide bandwidth radar receiver/exciter subsystem. As shown in FIG. 1, a digital waveform synthesizer (DWS) 110, operating at a clock frequency of 1 GHz, with a single-ended output 105, is capable of directly synthesizing chirp waveforms with a maximum bandwidth of approximately 375 MHz, after filtering 140. An RF up-converter 120 with a ×8 bandwidth multiplication chain can realize a system with a maximum RF bandwidth capability of 3 GHz. Broad RF bandwidth operation (fine range resolution) can be emphasized with this configuration, so stretch processing (de-ramp mixing) 170 is generally used to compress the RF bandwidth to a much narrower IF bandwidth. A high-speed, dual accumulator, DWS 110 is typically the source of transmit and receiver LO linear FM (chirp) waveform. At the receiving end generally is a high-performance, high dynamic range receiver/digitizer 160.

The single ended DWS 110 of FIG. 1 has fundamental limitations, which can be summarized as follows:
  The theoretical maximum synthesized bandwidth is ½ of the DWS clock frequency.
  The single ended DWS output is filtered, translated, and bandwidth multiplied to obtain the necessary LO frequency.

What is needed in the art are improved SAR systems that can overcome the foregoing limitation associated with radar dynamic range.

SUMMARY OF THE INVENTION

In light of current limitations in the radar art, the present invention has been developed that can employ Quadrature Digital Waveform Synthesis (QDWS) with error correction.

In accordance with unique features of the present invention, a Quadrature Error Corrected Digital Waveform Synthesizer (QECDWS) can be adapted to employ frequency dependent phase error corrections to, in effect, pre-distort the phase characteristic of the chirp, thereby compensating for the frequency dependent phase nonlinearity of the RF and microwave subsystem.

In accordance with another feature of the invention, a QECDWS employing frequency dependent correction vectors to the quadrature amplitude and phase of the synthesized output, whereby the quadrature corrections cancel the radars' quadrature upconverter (mixer) errors to null the unwanted spectral image.

In accordance with yet another feature of the present invention, system and methods are proposed that result in the direct generation of an RF waveform, which has a theoretical chirp bandwidth equal to a QECDWS clock frequency (1 to 1.2 GHz) including a Spurious Free Dynamic Range (SFDR) necessary for high dynamic range radar systems such as SAR.

In accordance with another feature of the present invention, novel systems and methods correcting for the problematic upconverter LO leakage apply precision DC offsets over the chirped pulse using a pseudo-random noise dither. The dither technique effectively produces a quadrature DC bias which has the precision required to adequately suppress the LO leakage.

It is yet another feature of the present invention to provide a novel calibration method that can be employed to calculate both the quadrature correction vectors and the LO-nulling DC offsets using the radar built-in test capability.

It is yet another feature of the present invention to provide a synthesizer that can support a 1.2 GHz clock frequency and will be implemented on a 3U (4.0×6.3 inch) PCI card.

It is yet another feature of the present invention to teach that by employing Quadrature Digital Waveform Synthesis (QDWS), i.e., generating both In-phase (I) and Quadrature-phase (Q) outputs, then quadrature mixing the output with a predetermined offset frequency, an exciter can be provided with the following advantages:
  The synthesized bandwidth is theoretically equal to the QDWS clock frequency (double that of the single ended DWS).
  By quadrature mixing the QDWS output, the chirp can be generated directly at the desired LO or intermediate center frequency prior to bandwidth multiplication.
  The necessary bandwidth multiplication to achieve a desired RF bandwidth is reduced by a factor of two over the single ended DWS implementation.

In accordance with a method for correcting phase errors associated with synthetic aperture radar (SAR) systems using a Quadrature Error Corrected Digital Waveform Synthesizer (QECDWS), the following steps can be followed:
  utilizing frequency dependent phase error corrections to pre-distort phase characteristic of chirp associated with a radar system to compensate for frequency dependent phase nonlinearity of RF and microwave subsystems associate with the radar;
  applying frequency dependent correction vectors to the quadrature amplitude and phase of the radar system's synthesized output, wherein quadrature corrections cancel the radar system's quadrature upconverter errors to null the unwanted spectral image; and
  generating an RF waveform having a theoretical chirp bandwidth equal to the QECDWS clock frequency of about 1 to 1.2 GHz with a high Spurious Free Dynamic Range (SFDR) necessary for high dynamic range radar systems such as a SAR.

These and other unique features of the present invention will become apparent to those skilled in the art upon reviewing the following detailed specification, drawings and claims.

Additional novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the scope of the invention will become apparent to those of skill in the art from the detailed description of the invention and claims that follow.

DESCRIPTION OF THE DRAWINGS

The accompanying figures, in which like reference numerals refer to identical or functionally-similar elements throughout the separate views and which are incorporated in and from part of the specification, further illustrate the present invention and, together with the detailed description of the invention, serve to explain the principles of the present invention.

FIG. 1 illustrates a simplified block diagram of a current high frequency, wide bandwidth, high dynamic range radar.

FIG. 2 illustrates a block diagram for a new QDWS-based radar exciter;

DETAILED DESCRIPTION OF PREFERRED EMBODIMENTS

Referring to FIG. 2, a QDWS-based exciter 210 is shown that has been adapted for employing bandwidth multiplication in accordance with an embodiment of the present invention. The advantages of the present QDWS-based exciter 210 are very attractive when considering a system where bandwidth multiplication is not necessary. In other words, the QDWS output bandwidth, which can be from 70% to 80% of the QDWS clock frequency, generally satisfies the system RF bandwidth requirement. For a SAR, a 1 GHz QDWS can easily support range resolution capabilities on the order of 1-foot, without bandwidth multiplication. In this case, the RF frequency can be directly generated with the QDWS-based exciter 210 and quadrature mixer 220, greatly simplifying the analog portion of the exciter.

The preceding seems attractive, until the major faults of the QDWS-based exciter 210 are considered. Main limitations lie in the quadrature amplitude and phase balance and the LO to RF isolation of the quadrature mixer 220. The quadrature imbalance results in an unwanted spectral image which is symmetrically opposite of the mixer output center frequency. The mixer LO to RF leakage generally results in an unwanted spurious tone at the center frequency of the mixer output, which then propagates through a filter 230 and a multiplier 240 as shown in FIG. 2.

Figure 3:
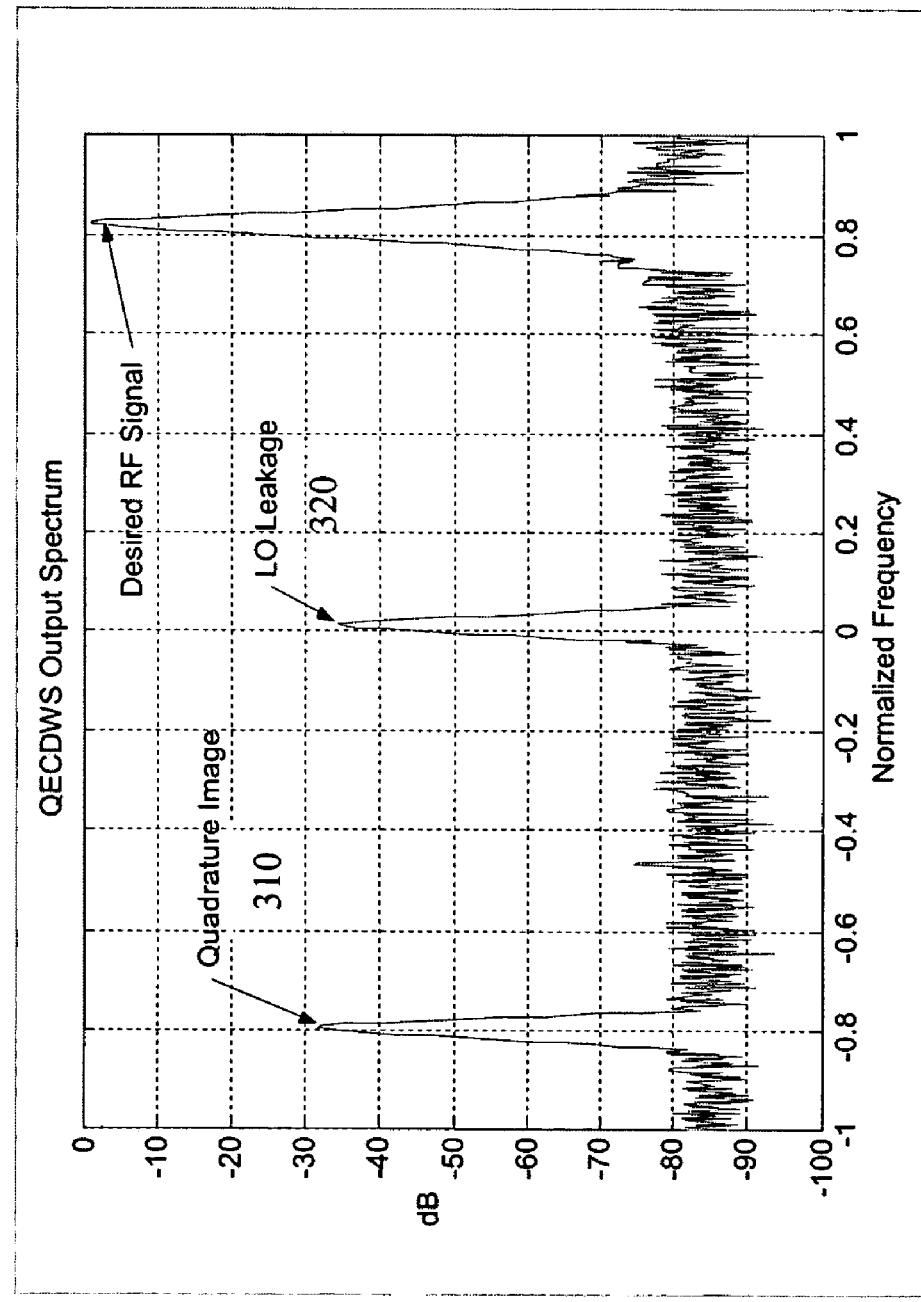
FIG. 3 illustrates a chart of the output spectrum of a QDWS and quadrature mixer without applied corrections.

Both the quadrature image 310 and LO leakage 320 spurious signals are shown in the spectrum plot of FIG. 3 for a single QDWS output tone. Note that the spurious terms are on the order of −30 to −35 dBc. This is typically unacceptable for high dynamic range radar systems which strive for exciter spurious outputs levels at or below −45 to −55 dBc, or less. If a bandwidth multiplier is used in the exciter, then the spurious output of the quadrature mixer would be required to be 6 dB lower for every doubling of the frequency. The proposed Sandia National Laboratories MiniSAR, for example, employs a 1.2 GHz QDWS with a 4×bandwidth multiplication in the upconverter. This translates to a peak spurious requirement of <−57 to <−67 dBc at the quadrature mixer output.

When linear FM chirp waveforms are considered, along with RF bandwidth multiplication (for fine range resolution) and stretch processing (for bandwidth compression), the unwanted spurious signals manifest themselves as unwanted chirped waveforms in the deramped IF. Analysis of the radar model of FIG. 1 utilizing the QDWS-based exciter of FIG. 2 results in a general expression for the range focused (deramped) IF signal. If the following parameter definitions are made:

M is the exciter bandwidth multiplication factor,

I and L are the relative magnitudes of the quadrature image and LO leakage terms, respectively, $\omega_{DWS}$ is the instantaneous frequency of the QDWS, and τ is the range delay time, then an approximate expression for the composite IF signal $x_F$ is $$x_F \cong 1 + MI(e^{2j\omega_{DWS}t} + e^{-2j\omega_{DWS}(t-\tau)}) + ML(e^{j\omega_{DWS}t} + e^{-j\omega_{DWS}(t-\tau)}). \quad (1)$$

The skilled can appreciate the following observations while inspecting equation (1):

The MI( ) and ML( ) terms are undesired signals due to the image and leakage spurious, respectively, from the quadrature mixer.

The relative level of the undesired signals is multiplied by M as expected.

The image error term is a chirped complex sinusoid with twice the chirp rate of the original DWS chirp.

The offset leakage term is a chirped complex sinusoid with the same chirp rate of the original DWS.

The chirp rate multiplier for the error terms is the same, regardless of the bandwidth multiplication factor M. Only the level of the error signals changes with M.

In the spectral domain, the spurious terms have the notional effect of raising the noise floor. This is illustrated in the simulation plots of FIGS. 4a-4d. As can be appreciated, the presence of the either or both of the spurious outputs from the mixer can have a detrimental effect on the dynamic range of the radar system. By applying both quadrature amplitude and phase corrections to the QDWS 210 of FIG. 2, it is indeed possible to cancel the unwanted quadrature image. A complex (magnitude and phase) correction vector can be generated as a function of synthesizer instantaneous output frequency, which cancels the corresponding amplitude and phase error of the quadrature mixer. Similar techniques have been attempted, but do not compensate for the frequency dependence of the quadrature error. In addition, zero-frequency (DC) offsets to the QDWS outputs can be applied to effectively null the LO leakage term.

Quadrature Error Corrected Digital Waveform Synthesizer (QECDWS)

Figure 5:
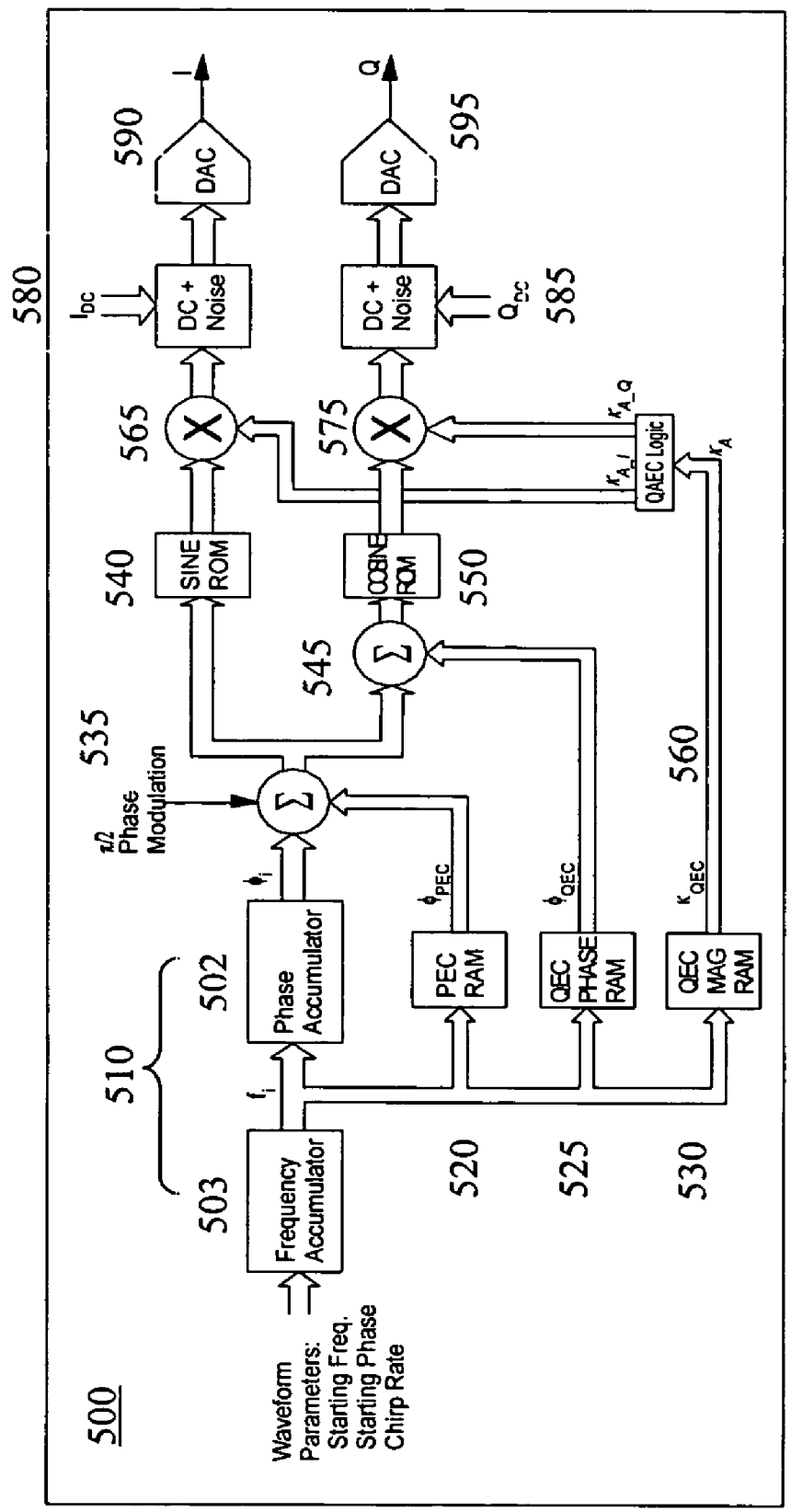
FIG. 5 is a block diagram of the Quadrature Error Corrected Digital Waveform Synthesizer (QECDWS) employing LO leakage nulling circuitry.

The block diagram of FIG. 5 illustrates the main components of the Quadrature Error Corrected Digital Waveform Synthesizer (QECDWS) 500 in accordance with a preferred embodiment of the present invention. The QECDWS 500 starts with a basic dual accumulator (frequency and phase) 510 to generate the necessary quadratic phase term ($\phi_i$). This phase is normally the input to a sine ROM look-up table 540. In the QECDWS 500, the output of a Phase Error Correction (PEC) RAM 520 is added 535 to the instantaneous phase $\phi_i$ to correct for frequency dependent phase nonlinearities in the radar RF subsystem. The PEC RAM 520 is addressed by the instantaneous frequency ($f_i$) output of the frequency accumulator 503. This technique, combined with built-in loop capability of the radar, allows the system to be calibrated to mitigate the non-linear phase contributions of the RF subsystem. The effect on a fine-resolution SAR is to improve (sharpen) the impulse response of the radar to maximize effective resolution capability and optimize image quality in the range dimension. Frequency dependent PEC has been successfully implemented on Sandia National Laboratories developed SARs over the past 12 years.

For a quadrature synthesizer, the quadrature amplitude and phase errors are compensated for by correction coefficients stored in the Quadrature Error Correction (QEC) RAM 525/530. Two RAMs, one for phase 525 and one for magnitude 530, are used. The QEC phase RAM 525 output is added 545 to the instantaneous phase of the cosine branch of the SINE/COSINE ROM 540/550. The amplitude correction from the QEC magnitude RAM 530 is applied to one of two multipliers 565/575 located at each of the sine and cosine ROM 540/550 outputs. Which multiplier is "active" is based on the sign of the twos-compliment 560 output of the QEC MAG RAM 530.

DC terms $I_{DC}$ and $Q_{DC}$ are applied 580/585 prior to the I and Q DACs 590/595. This can be implemented as a simple adder. For wide-band synthesizer implementations which employ high (1 GHz or greater) DAC clock rates, however, DAC precision may not be up to par with the DC offset precision required to effectively null the quadrature mixer LO leakage. For example, a 10-bit DAC would have a theoretical precision capable of reducing the LO leakage, through DC offset, to approximately −60 dBc (~6 dB per bit). In reality, for high-speed DACs, the actual precision is indicated as an "effective" number of bits (ENOB), which can be 1 or 2 bits less than the actual DAC input width.

If lower levels are needed, then the effective precision of the DC offset needs to be increased. One technique involves the addition of the DC offset at the DAC outputs. This is not generally an attractive solution since an additional pair of low-speed DACs would need to be included, plus analog circuitry to apply the necessary DC offset. A solution which applies the DC offset in the digital domain is preferred.

In a pulsed radar, the performance degradation due to the LO leakage is proportional to the average LO leakage over the radar pulse. If the average DC offset as applied over the chirped pulse can be generated with a precision finer than that dictated by the DAC precision, then the problem of the DAC precision being insufficient to satisfy the requirements of DC offset precision is essentially solved.

Figure 6:
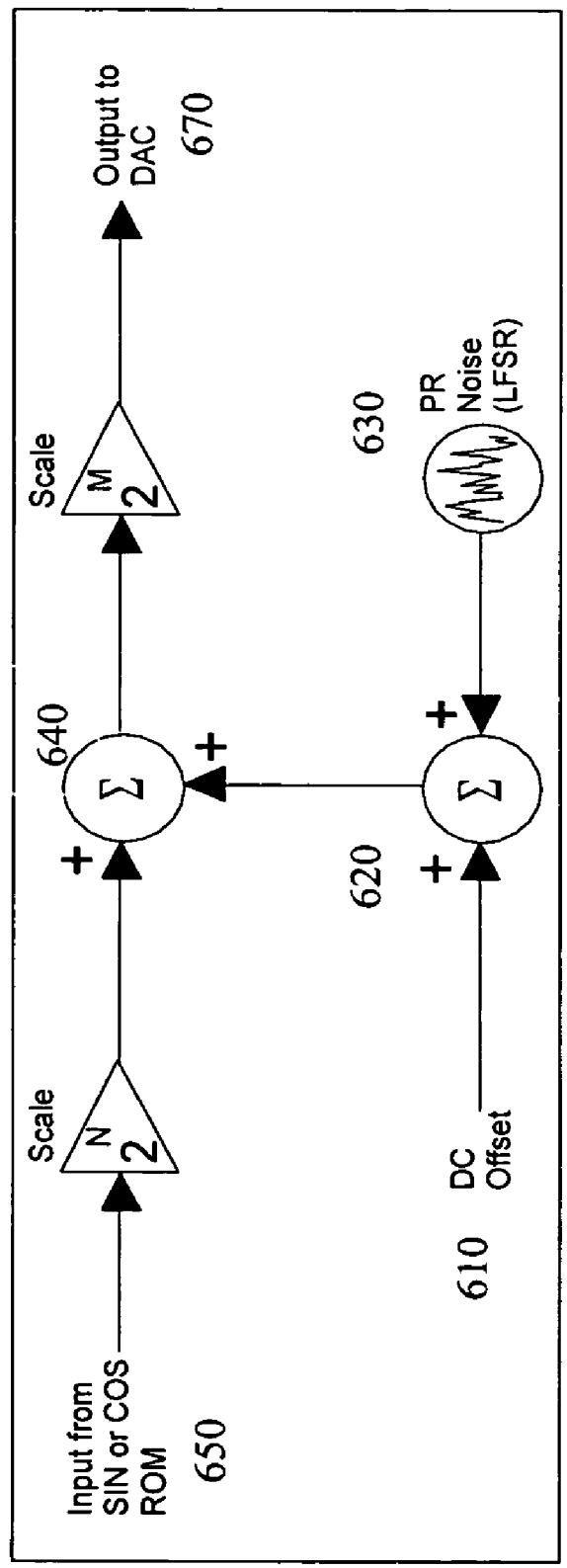
FIG. 6 illustrates a block diagram for a circuit employing DC bias with noise dither.

A solution herein described introduces pseudo-random noise to the DC offset before applying it to the DAC input. The uniformly distributed noise is easily generated by a linear feedback shift register (LFSR) in the digital domain. A block diagram of the DC offset circuit with noise dither is shown in FIG. 6.

A DC offset value 610 ($I_{DC}$ or $Q_{DC}$) with the required precision is added 620 to a uniformly distributed random noise generated by a LFSR 630. This DC+Noise signal is then added 640 to the properly scaled sine or cosine ROM output 650. The noise dither effectively enables the average DC value over the pulse to be set to a value which has a precision that is only limited by the width of the DC offset word and the length of the noise sequence (number of registers in the LFSR). For example, the current implementation of the QECDWS with dithered DC applied allows us to null the LO level to <−65 dBc, with <−75 dBc consistently attainable. This is achieved using a DAC with significantly less instantaneous precision (ENOB) than that dictated by the attained LO suppression.

The presence of the noise dither circuit also provides a side benefit. For some applications, which primarily use narrow-band or fixed-frequency waveforms, noise dithering is useful to increase the spurious free dynamic range (SFDR) at the output to the DAC 670, at the expense of overall signal to noise ratio (SNR). This is a common technique for systems employing mixed-mode signal conversion (DACs and ADCs). The noise level can easily be changed, or disabled all together, to provide maximum flexibility of the synthesizer.

Figure 7:
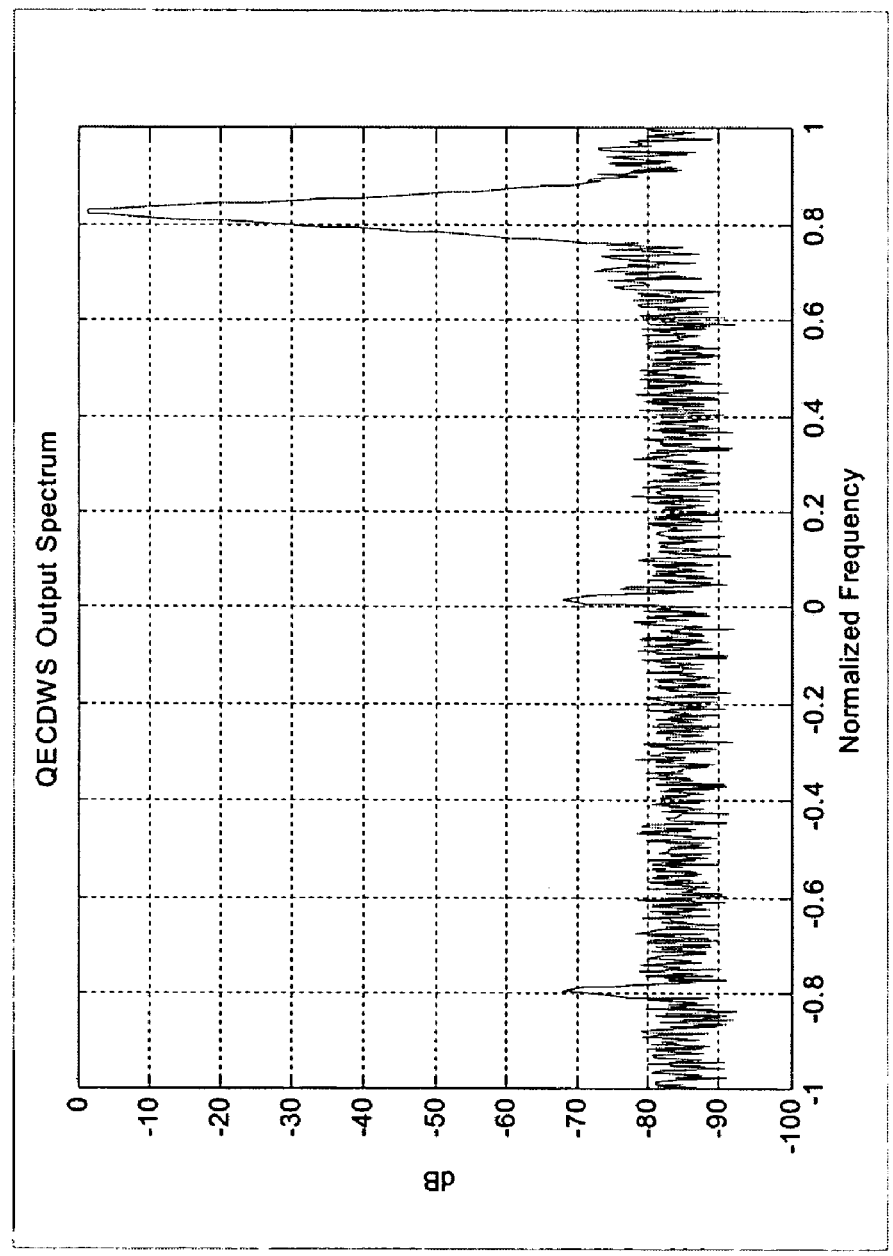
FIG. 7 is a graphical illustration of the output spectrum of a QDWS and quadrature mixer with quadrature and DC corrections applied.

The spectrum plot of FIG. 7 illustrates the effect of the quadrature and DC corrections to the QECDWS/quadrature mixer output spectral purity. Comparing FIG. 7 to FIG. 3, it can be seen that the spurious levels have been reduced to <−65 dBc, which is acceptable for a wide-bandwidth, high performance SAR exciter application. Lower levels are attainable with additional calibration iterations.

Calibrating the QECDWS

Figure 4:
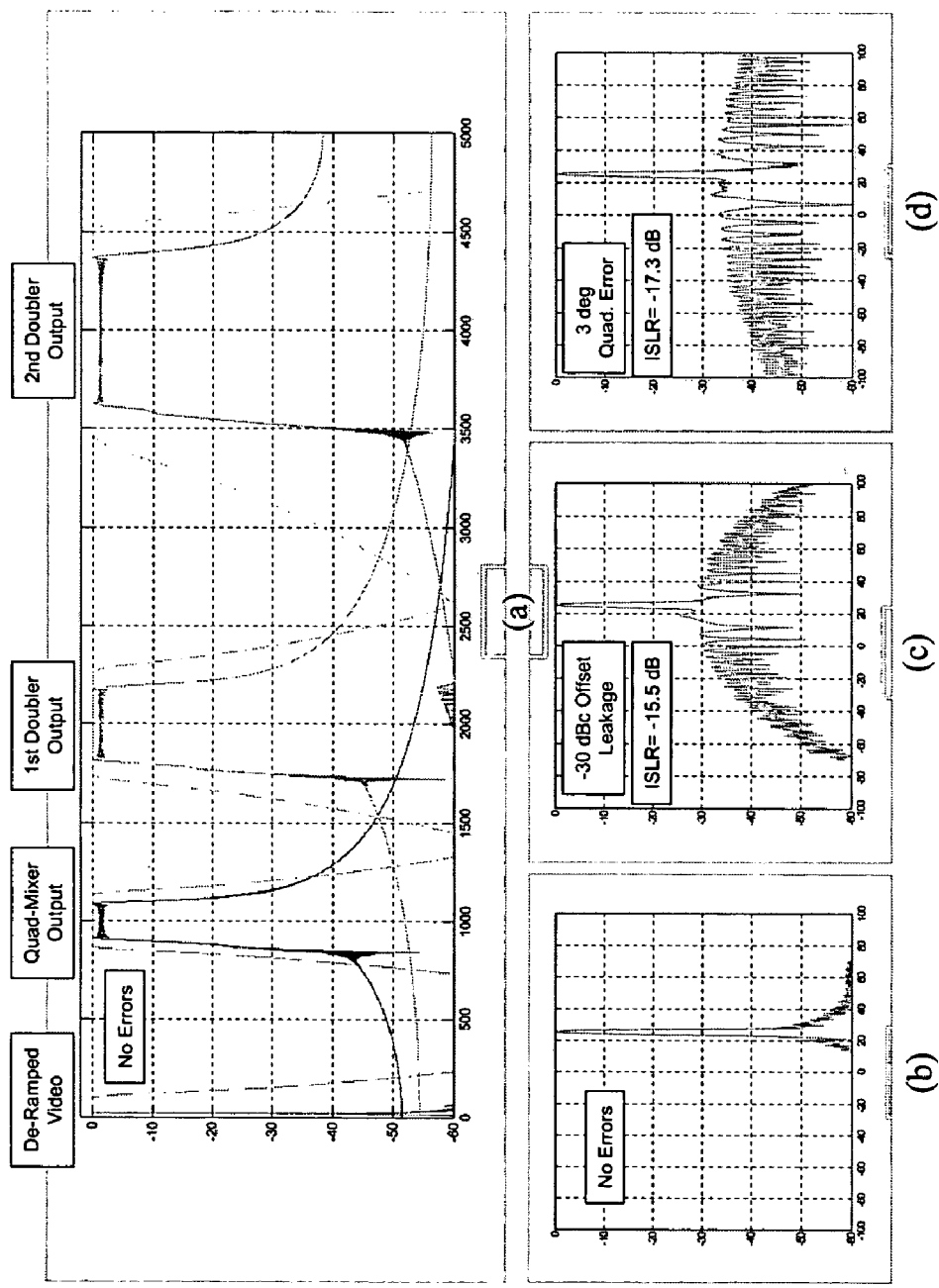
FIG. 4 illustrates simulation results for the spectrum along the exciter multiplier chain (top), wherein the bottom plots illustrate the effect on the IF (video) spectrum due to offset (LO) leakage (center) and quadrature phase error (right) in the QDWS and quadrature mixer.

The QECDWS of the present invention essentially provides the hardware "hooks" required to null the unwanted LO leakage and quadrature image spurious outputs of the mixer. The relatively low calibrated spurious levels, coupled with time and temperature variations of the radar hardware, make it necessary to implement the calibration "loop" as part of the radar itself. This would allow periodic, perhaps autonomous calibration to occur, for example, between data collection passes. The bandwidth multiplication and stretch processing of a fine-resolution SAR, however, places the unwanted spurious energy in the same IF frequency band as the desired IF signal (as shown in FIG. 4). Not only will it be difficult to separate signal from spurious in the IF band, it is also difficult, if not impossible, to separate the LO leakage and quadrature image spurious signals from each other. The solution to this lies in the exploitation of the other sample domain utilized in a SAR. This is the pulse-to-pulse or Doppler domain.

Analysis and simulation have demonstrated that simple pulse-to-pulse 0/π phase modulation can be performed to essentially separate the undesirable spurious outputs from the desired signal. Furthermore, by applying a rotating phase modulation in π/2 increments, the LO leakage and the quadrature image terms can also be segregated in Doppler frequency space. The phase rotation is digitally applied to the QECDWS prior to the sine and cosine ROMs (refer to the "π/2 Phase Modulation" input of FIG. 5.) The phase modulation is performed in a radar loop-back mode, where the exciter RF output is looped back through a delay device to the receiver RF input. Since coherent radar systems (e.g., SAR) routinely integrate multiple pulses to generate a final product (image), it is feasible to process multiple pulses coherently while applying π/2 phase rotation to the QECDWS on a pulse-to-pulse basis. This, coupled with on-board Doppler processing (real-time SAR image formation), provides the necessary tools to perform in-system calibration of the QECDWS.

Separation of the unwanted LO leakage and quadrature image terms in Doppler space allows them to be quantified individually. This sets the stage for a simple two-dimensional search algorithm to iteratively null the unwanted spurious signals. For the LO leakage, the scalar DC offset values $I_{DC}$ and $Q_{DC}$ (see FIG. 5) are searched to minimize the Doppler spectrum component due to the LO leakage. As for the quadrature amplitude and phase coefficients, vector quantities should first be determined since these corrections should vary as a function of instantaneous frequency. It was stated earlier that the LO leakage and the quadrature image terms result in chirped waveforms in the IF spectrum. This implies that one can "view" the spurious level as a function of QECDWS instantaneous frequency. This allows one to determine the quadrature correction coefficients as vectors in the QECDWS frequency space. Since a typical SAR has a video (IF) bandwidth, which is somewhat less than the DWS bandwidth, the necessary search for pieces that "fit" within the IF bandwidth should first be undertaken. The "pieces" are then concatenated to form the full QEC vector.

Detailed analysis and simulation of the calibration technique has been performed. It is informative, in this context, to illustrate the 2-dimensional range-Doppler spectrum for a delay line (point target) simulation of a radar employing bandwidth multiplication, stretch processing, and pulse-to-pulse 0:π/2 phase rotation. An example of this is shown in FIG. 8.

Figure 8:
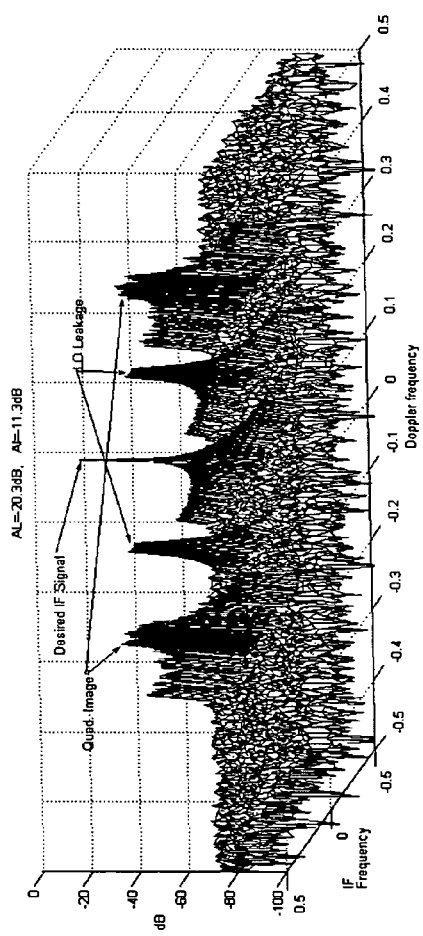
FIG. 8 is a graphical illustration of the simulated range-Doppler spectrum of the QECDWS based radar with quadrature mixer errors and π/2 phase rotation.
Figure 9:
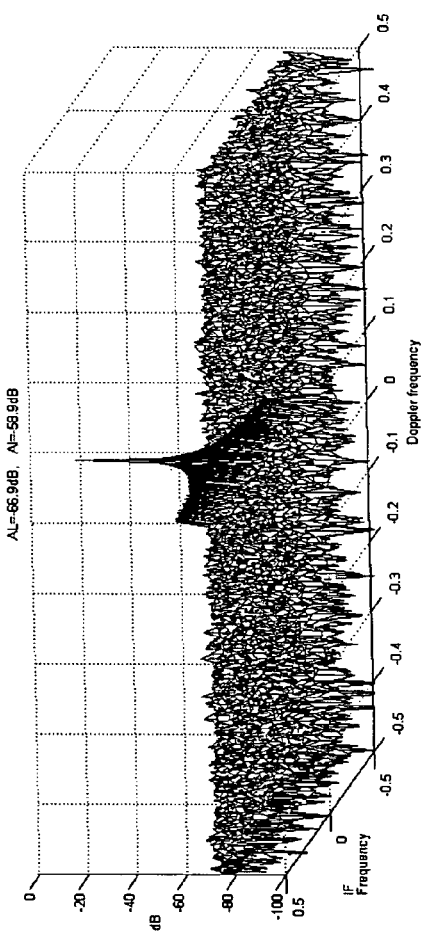
FIG. 9 is a graphical illustration of the simulated 2-D spectrum after calibration.

FIG. 8 illustrates the Doppler frequency domain separation of the desired signal (fixed frequency sine wave), the spurious due to LO leakage (1×bandwidth chirp), and the spurious due to the quadrature image (2×bandwidth chirp). Application of a 2-D gradient search algorithm results in the reduction of the LO leakage and quadrature image terms to the noise floor. The same 2-D spectrum after calibration is shown in FIG. 9.

Figure 10:
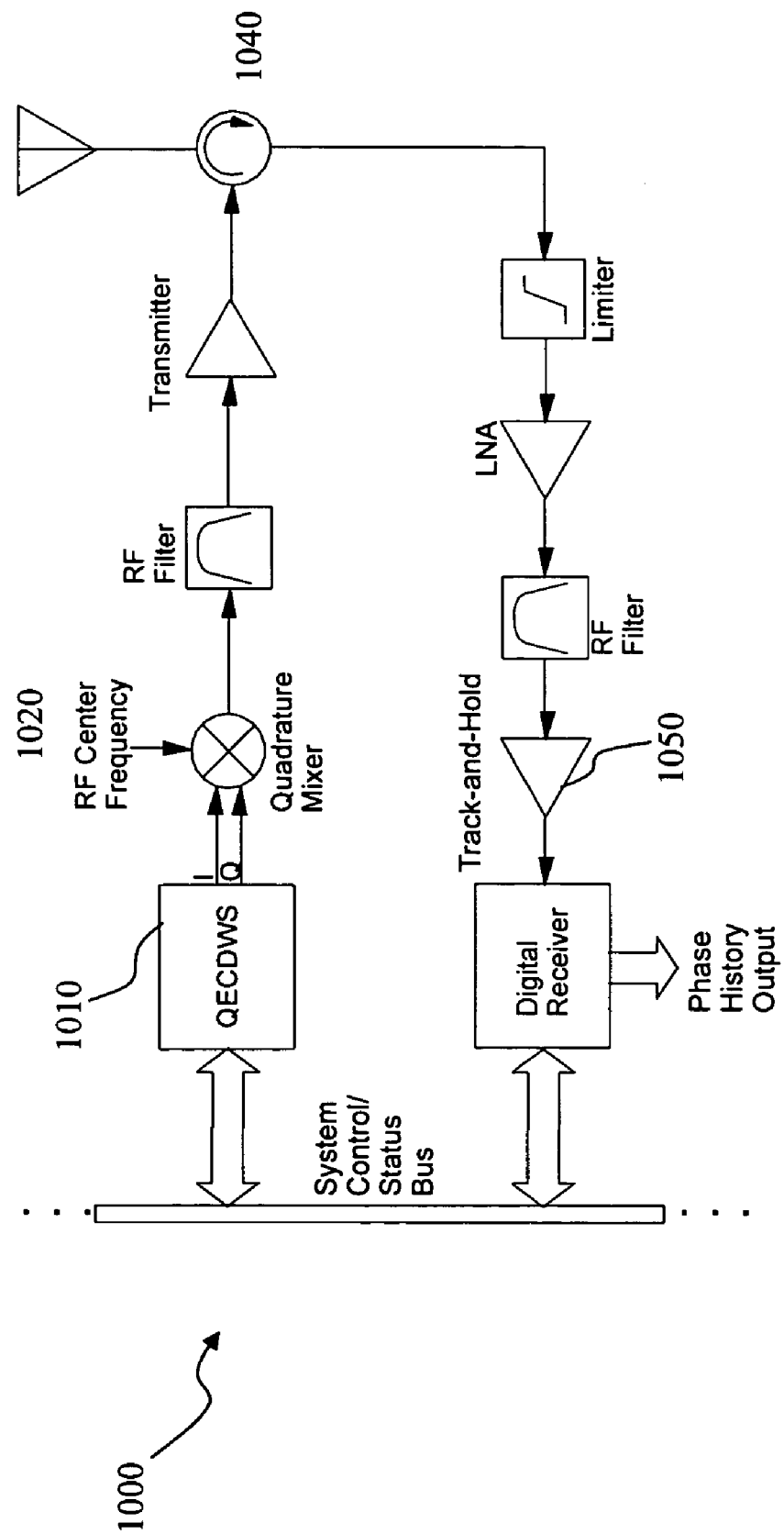
FIG. 10 is a block diagram of a "digital" radar receiver/exciter.

The pulse-to-pulse phase rotation calibration technique works well in a wide bandwidth system employing a QECDWS, bandwidth multiplication, and stretch processing. Calibration of a "digital radar" is, however, much simpler. FIG. 10 illustrates a receiver/exciter configuration 1000 for next-generation SARs employing a QECDWS 1010, direct RF conversion (quadrature mixing), and direct RF sampling (Super-Nyquist sampling).

It should be appreciated that prior synthesizer and digital receiver technology, namely mixed-mode ASICs, are not up to par for high performance radar systems needing ultra-fine resolution (2 to 3 GHz bandwidth) and RF center frequencies at X-band (8 to 10 GHz) and up. Some proposed systems with moderate resolution capability (≧1-foot) and operating at RF frequencies in the L to C bands (1 to 6 GHz) can, however, with current mixed-mode ASIC and Track-and-Hold (T/H) 1050 technology, reap the advantages of the digital radar of FIG. 10. As a plus, the wide sampling bandwidth of current high-speed ADC technology allows the digital receiver to sample the full QECDWS bandwidth in a loop-back test configuration. This allows the QECDWS to be calibrated without the use of a delay line (to time-separate the transmit and receive LO chirps) and without the need for any pulse-to-pulse processing employing π/2 phase rotation modulation. Mixed mode ASIC and T/H technology should continue to improve following the present teachings of the preferred embodiments, allowing fine resolution, high frequency, digital radars to be realized in the not so distant future.

A QECDWS has been implemented by the present inventors utilizing a Xilinx Virtex II®, a trademark of Xilinx Corporation, Field Programmable Gate Array (FPGA). The system included error correction RAMs and two DACs. In tighter environments, 3U compact PCI, high performance 1.2 GS/s QECDWS can be utilized, which can be tailored for application in small-scaled SAR sensors. A small-scaled 3U (4.0×6.3 inch) synthesizer employs two modified Rockwell Scientific RDA012M4V2 1.3 GS/s DACs. The DACs have a built-in 4:1 multiplexer, allowing the DACs to interface directly to the synthesizer FPGA. The entire synthesizer, with all correction logic, can be implemented in a Xilinx XC2V3000 FPGA. On board RAM can be provided for the error correction vectors. An on-board, non-volatile configuration flash RAM loads the FPGA firmware at board power-up. The control interface is a standard 64-bit, 66 MHz PCI. This type of synthesizer is one of the major building blocks of a MiniSAR radar currently under development at Sandia National Laboratories.

Analysis, simulation, and hardware implementation of the QECDWS have shown it to be a next-generation solution for small, lightweight, and low-cost SARs. The simplification of the analog RF subsystem as a result of the QECDWS, along with the digital receiver, is in direct accord with industry's vision for Mini-SARs.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A Quadrature Digital Waveform Synthesizer (QDWS) apparatus capable of correcting local oscillator (LO) leakage in a radar system, comprising:
   a complex bitstream, comprising an in-phase bitstream and a quadrature-phase bitstream;
   a first pseudo-random noise dither generator output;
   a second pseudo-random noise dither generator output;
   a precision in-phase DC bias, comprising an effective precision;
   a precision quadrature-phase DC bias, comprising an effective precision;

a complex waveform, comprising a in-phase (I) waveform and a quadrature-phase (Q) waveform; and a radio frequency (RF) transmission of the radar system, wherein the RF transmission contains an LO leakage component.

2. The apparatus of claim 1 wherein the LO leakage is corrected in the RF transmission of the radar system.

3. The apparatus of claim 2 wherein the LO leakage is consistently suppressed to at least −75 dBc.

4. The apparatus of claim 1 wherein the first pseudo-random noise dither generator output is uniformly distributed, and the second pseudo-random noise dither generator output is uniformly distributed.

5. The apparatus of claim 1 further comprising a first adder, comprising a plurality of inputs and an output, and an in-phase DC offset word, comprising a number of bits, wherein the first pseudo-random noise dither generator output is applied to a first input of the first adder and the in-phase DC offset word is applied to a second input of the first adder to produce the precision in-phase DC bias at the first adder output; and further comprising a second adder, comprising a plurality of inputs and an output, and a quadrature-phase DC offset word, comprising a number of bits, wherein the second pseudo-random noise dither generator output is applied to a first input of the second adder and the quadrature-phase DC offset word is applied to a second input of the second adder to produce the precision quadrature-phase DC bias at the second adder output.

6. The apparatus of claim 5 further comprising a third adder, comprising a plurality of inputs and an output, wherein the precision in-phase DC bias is applied to a first input of the third adder and the in-phase bitstream is applied to a second input of the third adder to produce a compensated in-phase bitstream at the third adder output; and further comprising a fourth adder, comprising a plurality of inputs and an output, wherein the precision quadrature-phase DC bias is applied to a first input of the fourth adder and the quadrature-phase bitstream is applied to a second input of the fourth adder to produce a compensated quadrature-phase bitstream at the fourth adder output.

7. The apparatus of claim 6 further comprising an in-phase digital-to-analog converter (DAC), comprising a plurality of inputs, an output, and an instantaneous precision, wherein the compensated in-phase bitstream is applied to a first input of the in-phase DAC and the in-phase waveform of the complex waveform is produced at the in-phase DAC output; and further comprising a quadrature-phase DAC, comprising a plurality of inputs, an output, and an instantaneous precision, wherein the compensated quadrature-phase bitstream is applied to a first input of the quadrature-phase DAC and the quadrature-phase waveform of the complex waveform is produced at the quadrature-phase DAC output.

8. The apparatus of claim 7 wherein the LO leakage is corrected in the RF transmission of the radar system.

9. The apparatus of claim 8 wherein the LO leakage is consistently suppressed to at least −75 dBc.

10. The apparatus of claim 7 wherein the effective precision of the precision in-phase DC bias is greater than the instantaneous precision of the in-phase DAC, and the effective precision of the precision quadrature-phase DC bias is greater than the instantaneous precision of the quadrature-phase DAC.

11. The apparatus of claim 7 further comprising a first noise sequence, comprising a number of bits, and a first pseudo-random noise dither generator, comprising an input and the output, wherein the first noise sequence is applied to the input of the first pseudo-random noise dither generator.

12. The apparatus of claim 11 further comprising a second noise sequence, comprising a number of bits, and a second pseudo-random noise dither generator, comprising an input and the output, wherein the second noise sequence is applied to the input of the second pseudo-random noise dither generator.

13. The apparatus of claim 12 further comprising a Quadrature Error Correction (QEC) phase error correction random access memory (RAM); a Quadrature Error Correction (QEC) amplitude correction RAM; and a Phase Error Correction (PEC) RAM wherein a Quadrature Error Corrected Digital Waveform Synthesizer (QECDWS) is formed, and wherein the QECDWS is capable of correcting problematic upconverter LO leakage when dithered precision DC biases are applied to bitstreams, and wherein the QECDWS is capable of correcting LO leakage, quadrature amplitude errors, and quadrature phase errors.

* * * * *